United States Patent
Ikeda

(10) Patent No.: US 6,189,402 B1
(45) Date of Patent: Feb. 20, 2001

(54) GEAR TRANSMISSION

(75) Inventor: Tadashi Ikeda, Kanagawa (JP)

(73) Assignee: Isuzu Motors Limited, Tokyo (JP)

( * ) Notice: Under 35 U.S.C. 154(b), the term of this patent shall be extended for 0 days.

(21) Appl. No.: 09/355,848

(22) PCT Filed: Dec. 7, 1998

(86) PCT No.: PCT/JP98/05523

§ 371 Date: Aug. 5, 1999

§ 102(e) Date: Aug. 5, 1999

(87) PCT Pub. No.: WO99/30062

PCT Pub. Date: Jun. 17, 1999

(30) Foreign Application Priority Data

Dec. 9, 1997 (JP) .................................................. 9-354084

(51) Int. Cl.[7] .................................................. B60K 20/00
(52) U.S. Cl. .................................... 74/473.36; 74/473.37
(58) Field of Search .................... 74/473.36, 473.37, 74/339, 335

(56) References Cited

U.S. PATENT DOCUMENTS

| | | | | |
|---|---|---|---|---|
| 2,748,910 | * | 6/1956 | Klecker | 192/3.5 |
| 3,529,487 | * | 9/1970 | Dolan | 74/477 |
| 4,543,846 | * | 10/1985 | Inui et al. | 74/477 |
| 4,567,785 | * | 2/1986 | Reynolds et al. | 74/477 |
| 5,809,836 | * | 9/1998 | Pätzold et al. | 74/337.5 |
| 5,996,436 | * | 12/1999 | Dreier et al. | 74/473.21 |

FOREIGN PATENT DOCUMENTS

| | | |
|---|---|---|
| 58-129531 | 9/1983 | (JP) . |
| 61-092342 | 5/1986 | (JP) . |
| 62-057819 | 4/1987 | (JP) . |
| 2-069171 | 5/1990 | (JP) . |
| 4-056262 | 5/1992 | (JP) . |
| 6-161584 | 1/1994 | (JP) . |

* cited by examiner

Primary Examiner—David Fenstermacher
(74) Attorney, Agent, or Firm—Browdy and Neimark

(57) ABSTRACT

A manual transmission is disclosed wherein a large number of shift arms are arranged evenly over a pair of selector rods. The design has the advantages of rendering the transmission compact in size, making it possible to enhance the stiffness of the shift arms, and making the layout of the gearshift mechanism more flexible. The synchromesh manual transmission 1 has a pair of selector rods 31, 32 arranged in parallel with the output shaft of the transmission 1. The selector rod 31 is mounted with a 1st-speed, one reverse shift arm 37 and its associated shift block 44 against sliding movement while mounted with a 2nd-, 3rd-speed shift arm 38 integral with a shift block for sliding movement. Likewise, another selector rod 32 is mounted with a 4th-, 5th-speed shift arm 39 for sliding movement and further connected to a shift lever 40 for a 6th-speed shift arm. The shift block mechanism 56 and the shift blocks 38, 39 are arranged in symmetry relationship about the center point C.

8 Claims, 4 Drawing Sheets

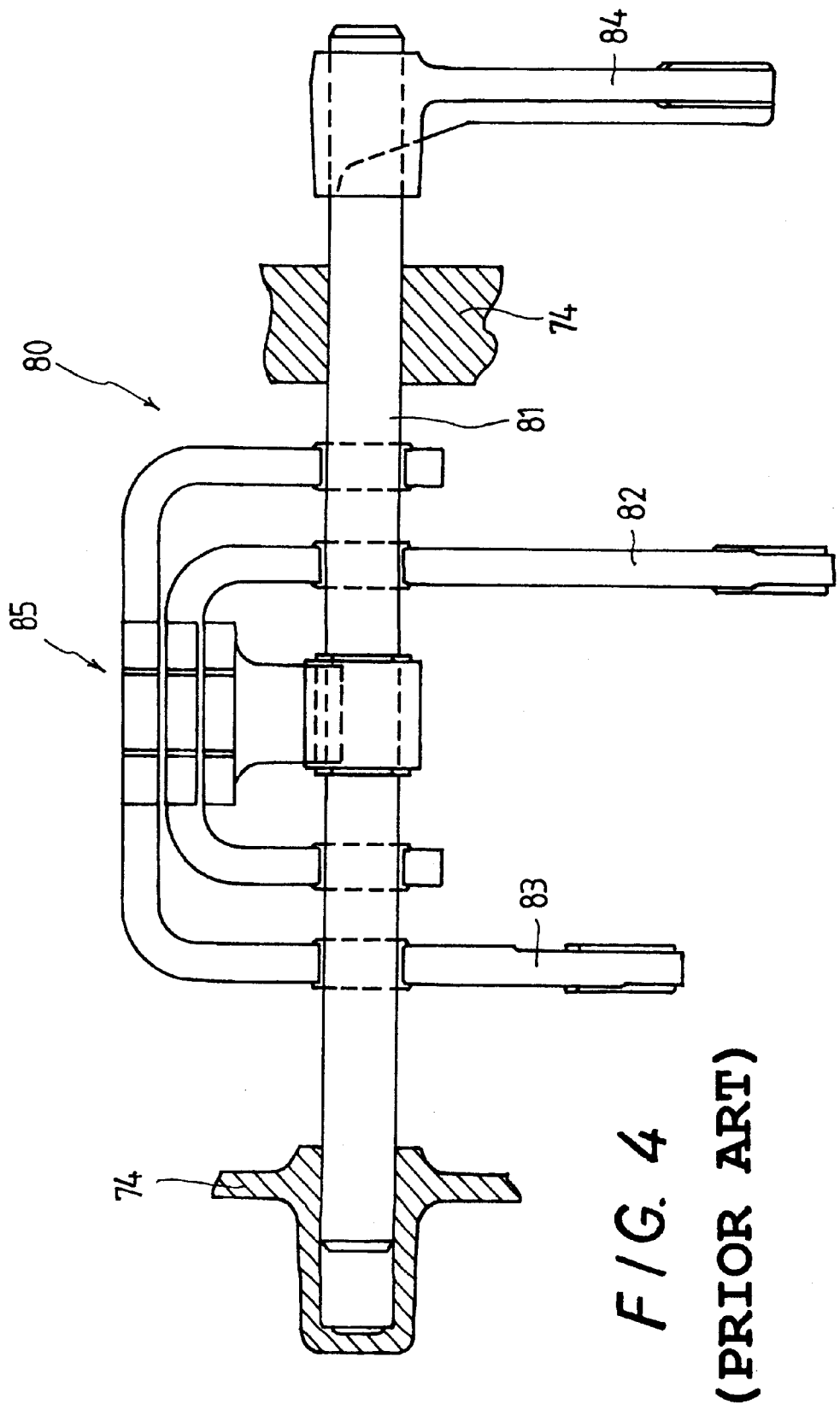
F/G. 4 (PRIOR ART)

GEAR TRANSMISSION

TECHNICAL FIELD

The present invention relates to a manual transmission with a driver-operated gearshift-lever mechanism, which are used in automobiles, construction machine vehicles, earth-moving equipment vehicles and the like.

BACKGROUND ART

Most manual transmissions are composed of low-speed gears having a spline clutch connected to the gears against rotation, high-speed gears having a spline clutch connected to the gears against rotation, and a clutch hub interposed between the low-speed gears and the high-speed gears and connected an output shaft against rotation. A spline sleeve is fitted on the clutch hub for axially sliding movement. On actual speed changing, the spline sleeve fitted with the clutch hub rotatable with the output shaft is moved axially into spline engagement with either one of the low-speed gears and the high-speed gears, thereby selecting a transmission ratio in accordance with the gear ratios of the low and high gears so as to obtain the power transmission at the selected transmission ratio.

A selector mechanism of such manual transmissions as described above is of the multi-rod gear selector type in which there may be shift arms, one to each spline sleeve, and selector rods are each provided for each of the shift arms to support the shift arms and transmit the power. The shift arms are separately connected with the individual selector rods, one to each shift arm, by suitable fixing means such as bolts, spring pins, welding and the like. In the design, one shift arm and one selector rod are in combination employed for a transmission ratio between a pair of low and high gears and, therefore, the five-speed, one-reverse manual transmissions require three selector rods and also the six-speed, one-reverse manual transmissions require four selector rods. Japanese Utility Model Laid-Open No. 57819/1987 discloses an example of the multi-rod gear selector mechanism.

Another selector mechanism of the manual transmissions is of the single rod gear selector type, although being minor in use, in which all desired shift arms are arranged on a single selector rod in order to reduce the transmission in its weight, required space, the number of the parts and the like. In this design, all the shift arms except for a shift arm at a design location are arranged so as to slide on a single selector rod.

FIG. 3 is a top plan view illustrating an exemplary prior gearshift mechanism of the single rod gear selector type. The gearshift mechanism 60 in FIG. 3 has low and high gear pairs for obtaining various speed ratios or transmission ratios. Further, there are provided selector rods extending over the overall length of a transmission case 74, one to each gear pair. That is, for the six-speed, one reverse manual transmission illustrated, it is necessary to install four selector rods extending through the full length of the transmission case 74, which are a first-speed, reverse selector rod 61, a second-, third-speed selector rod 62, a fourth-, fifth-speed selector rod 63 and a sixth-speed selector rod 64. The first-speed, reverse selector rod 61 is connected to a first-speed, reverse shift arm 65. Likewise, the second-, third-speed selector rod 62, the fourth-, fifth-speed selector rod 63 and the sixth-speed selector rod 64 are connected to a second-, third-speed shift arm 66, a fourth-, fifth-speed shift arm 67 and a sixth-speed shift arm 68, respectively. Shift blocks 69 to 72, each corresponding to each of the shift arms 65 to 68, are assembled on the second-, third-speed selector rod 62. There is provided engaging means operable in response to the manipulation of a shift lever, not shown, whether the engaging means is of a direct control type in which one end of the shift lever constitutes the engaging means or a remote control type in which the shift lever is operatively connected with the engaging means through wires or rods. Manipulating the shift lever thus causes the engaging means to make selective engagement with any one of the shift blocks 69 to 72, resulting in shifting any one of the shift arms 65 to 68, selected depending on the shift direction of the engaging means, so that any desired transmission range may be selected out of six-speeds and one reverse. On the gearshift mechanism of multi-rod gear selector type designed as described above, two or more selector rods occupy the space exceeding the area for the selector rods intrinsically indispensable for the transmission. This becomes a major problem exerting the great adverse influence upon the gearshift mechanism as to production cost, weight and the desired number of parts.

In contrast, FIG. 4 is a side elevation showing an exemplary prior gearshift mechanism of single-rod gear selector type. The gearshift mechanism 80 in FIG. 4 has a single selector rod 81 supported for sliding movement by the transmission case 74 and carrying thereon all shift arms 82 to 84. Both the first-, second-speed shift arm 82 and third-, fourth-speed shift arm 83 are movable in a linearly sliding manner relatively of the selector rod 81, whereas the fifth-speed shift arm 84 is fixed to the selector rod 82. Shift block arrangement 85 is concentrated on a design location for selectively shifting the shift arms 82 to 84. In the single rod gear selector type, the permissible spaces for each of the shift arms 82 to 84 become very small and, therefore, each shift arm is inevitably made slender although such an structure is less desirable because the shift arms become reduced in stiffness. In addition, the practical gearshift mechanism 80 makes no remarkable saving in the desired space for all the parts, including the shift arms 82 to 84 and the selector rod 81, compared with the gearshift mechanism 60 of multi-rod gear selector type having four selector rods. Moreover, the need of a large number of forward speeds such as the six-speed, one reverse transmissions in recent years makes much more it difficult to assemble all shift arms on a single selector rod.

In the conventional gearshift mechanism of multi-rod gear selector type, the problem as described above arises that increased number of forward speeds increases the desired number of the selector rods. Moreover, the aggregation of the shift blocks on one location results in requiring such arrangement that the shift blocks for the shift arms corresponding to the outer opposing selector rods are to be formed on the extensions of the shift arms, which elongate beyond the inner selector rods. This causes the inevitable drawback in which the gearshift mechanism becomes greater in height so that it is hard to make it compact in size. In addition to the above, the shift blocks should be each assigned exclusively to each of the selector rods and, therefore, the parts necessary for gearshift in corresponding to the shift blocks have to be provided at every shift block. In contrast, on the prior gearshift mechanism of single rod gear selector type, the shift arms are limited in material to pressed iron alloys, cast iron alloys or the like, which is relatively higher in strength in order to avoid a deficiency in stiffness owing to the slender structure of the shift arms. Moreover, increased number of forward speed ranges causes such inconvenience that all shift arms may not be kept round a single selector rod. In recent years, accordingly, much attention has been given to a gearshift mechanism, which may contribute to make the transmissions compact in size, reduce the number of the desired parts and make available of inexpensive materials thereby being reduced in production cost.

The present invention has for its primary object to overcome the problems described above and in particular to provide a manual transmission having two selector rods, which design may reduce the desired number of selector rods by roughly half of the selector rods required in the multi-rod gear selector type while make it possible to improve the stiffness of the shift arms compared with the single rod gear selector type in which all shift arms are integrated on the single gear selector rod, whereby the layout design of the shift arms and the selector rods may afford to make the gearshift mechanism less in its height.

DISCLOSURE OF INVENTION

The present invention relates to a manual transmission comprising power transmitting mechanisms provided with gear pairs that are different in transmission ratio from each other and accommodated in a transmission case, an input shaft for applying a torque to the power transmitting mechanisms, an output s haft applied with a converted torque transmitted through the power transmitting mechanisms in which a rotation of the input shaft is changed in rotational speed by one gear pair selected depending on a selection and shift manipulation of a gearshift lever, a pair of selector rods arranged in parallel with the output shaft, shift blocks mounted on the selector rods so as to be selected in accordance with the selection manipulation of the gearshift lever and then moved along the selector rods to any shift direction in response to the shift manipulation of the gearshift lever, and shift arms arranged correspondingly to the shift blocks and movable towards the shift direction through the selected shift block, depending on the shift manipulation of the gearshift lever, thereby to select the gear transmitting the rotation from the input shaft to the output shaft, wherein the selector rods are each provided thereon with any one of the shift arms and its associated shift block, which are mounted on the selector rod against axial movement, and also provided with another shift arm having the associated shift block, which is mounted on the selector rod for sliding movement.

On operation of the manual transmission constructed as described just above, the select manipulation of the gearshift lever selects a desired shift block out of plural shift blocks. Subsequent shift manipulation of the gearshift lever causes the selected shift block to move in a desired shift direction, thereby resulting in moving the associated shift arm in the shift direction. That is to say, shifting the selected shift block to the desired shift direction selects a desired gear pair out of the gear pairs different in transmission ratio from each other, thereby speed-changing the rotation of the input shaft through the selected gear pair to drive the output shaft with the desired transmission ratio. Each selector rods arranged in parallel with the output shaft is mounted thereon with one shift arm and its associated shift block against axial movement by any suitable fixing or fitting means, and further mounted thereon with another shift arm for axially sliding movement, which shift arm is provided integrally or separately with the associated shift block. In the manual transmission of the present invention, accordingly, only two selector rods may be necessary. This may diminish the required number of the selector rods and also contribute for improving the shift arms in stiffness compared with the shift arms that might be otherwise concentrated on the single selector rod. Moreover, no shift block extends beyond any other shift blocks to be concentrated on the common selector rod whereby the extensive flexibility may be allowed for the layout or design of the shift arms and shift blocks so that less space may be sufficient for the shift mechanism of the manual transmission. By the manipulation to move any one of the selector rods to the shift direction, the shift arm associated with the moved selector rod selects the desired one of the two gear pairs that are different in transmission ratio from each other. The number of the shift arms to be mounted on the selector rods for axially sliding movement may be prepared in coincidence with the number of the gear pair for the desired transmission ratios.

According to one aspect of the present invention, the shift blocks are each provided with an engaging portion to be brought into engagement with an engaging means that is moved depending on the select manipulation of the gearshift lever, and the engaging portions on the shift blocks are arranged in concentrated relation with each other on a space between the paired selector rods. The shift mechanism of the manual transmission may be made compact in size by aggregating the engaging portions of the shift blocks in the space between the paired selector rods.

According to another aspect of the present invention, the engaging portions on the shift blocks are in alignment with each other along the select direction on the neutral phase of the transmission, so that the engaging portions are allowed to move in the select direction normal to the selector rods, depending on the select manipulation of the gearshift lever. In accordance with the manual transmission constructed as described above, the engaging means moves across the engaging portions of the shift blocks, which are in alignment with each other along the select direction normal to the selector rods, into engagement with the engaging portion of the selected shift block, depending on the select manipulation of the gearshift lever. The selected shift block is then moved, holding the engaging means in its engaging portion, towards the shift direction by the manual shift of the gearshift lever.

According to a further another aspect of the present invention, the shift blocks fixed on the selector rods against sliding movement are identical in structure with each other while the shift blocks for the shift arms mounted on the selector rods for sliding movement are also identical in structure with each other, and all the shift blocks are arranged so as to be concentrated with each other on the neutral phase of the transmission in symmetric relation with respect to a central point of the concentrated shift blocks. This design has the advantage of universality of components and parts, or the shift blocks, of the manual transmission.

According to another aspect of the present invention, the selector rods and the shift arms mounted on the selector rods for sliding movement are each locked against accidental moving at any one of its neutral position and shift positions, which are spaced apart from the neutral position, by means of detent mechanisms that are each provided to the transmission case. The detent mechanisms may surely prevent the selector rods and the shift arms from the accidental movement on either of the neutral and gear positions when the shifts of the shift block are made from one speed to another, thereby help ensure the reliable manipulation of the gearshift lever as well as render the drivers better shift quality.

In accordance with another aspect of the present invention, the selector rods as well as the shift arms mounted on the selector rods for sliding movement are each provided thereon with notches that are arranged in coincidence with the neutral and shift positions selected by manipulating the gearshift lever. Further, the detent mechanisms are each comprised of a detent ball to be fitted into any one of the notches, a means for urging the ball towards the associated notch, and a detent casing accommodating therein the ball and urging means.

In addition to the above, the detent mechanisms are each attached to the transmission case by fitting the detent casing into a bore formed in the transmission case.

In accordance with a further another aspect of the present invention, the power transmitting mechanisms are each comprised of a clutch hub connected to the output shaft, a pair of confronting synchronizing gears for the gear pairs mounted on the output shaft for rotation, facing to axially opposing sides of the clutch hub so as to transmit the rotation from the input shaft with any preselected transmission ratio, a sleeve splined to the clutch hub for axially sliding movement along the output shaft by moving the shift arms in the shift direction, and blocking rings each provided between the clutch hub and any one of the paired synchronizing gears to make clutch-engagement with both the sleeve and the associated synchronizing gear, depending on the shift of the sleeve, thereby synchronizing in rotation the clutch hub with the associated synchronizing gear.

BRIEF DESCRIPTION OF DRAWING

FIG. 4 is a fragmentary side elevation, partially in section, of a conventional gearshift mechanism of single rod gear selector type.

BEST MODE FOR CARRYING OUT THE INVENTION

Figure 1:
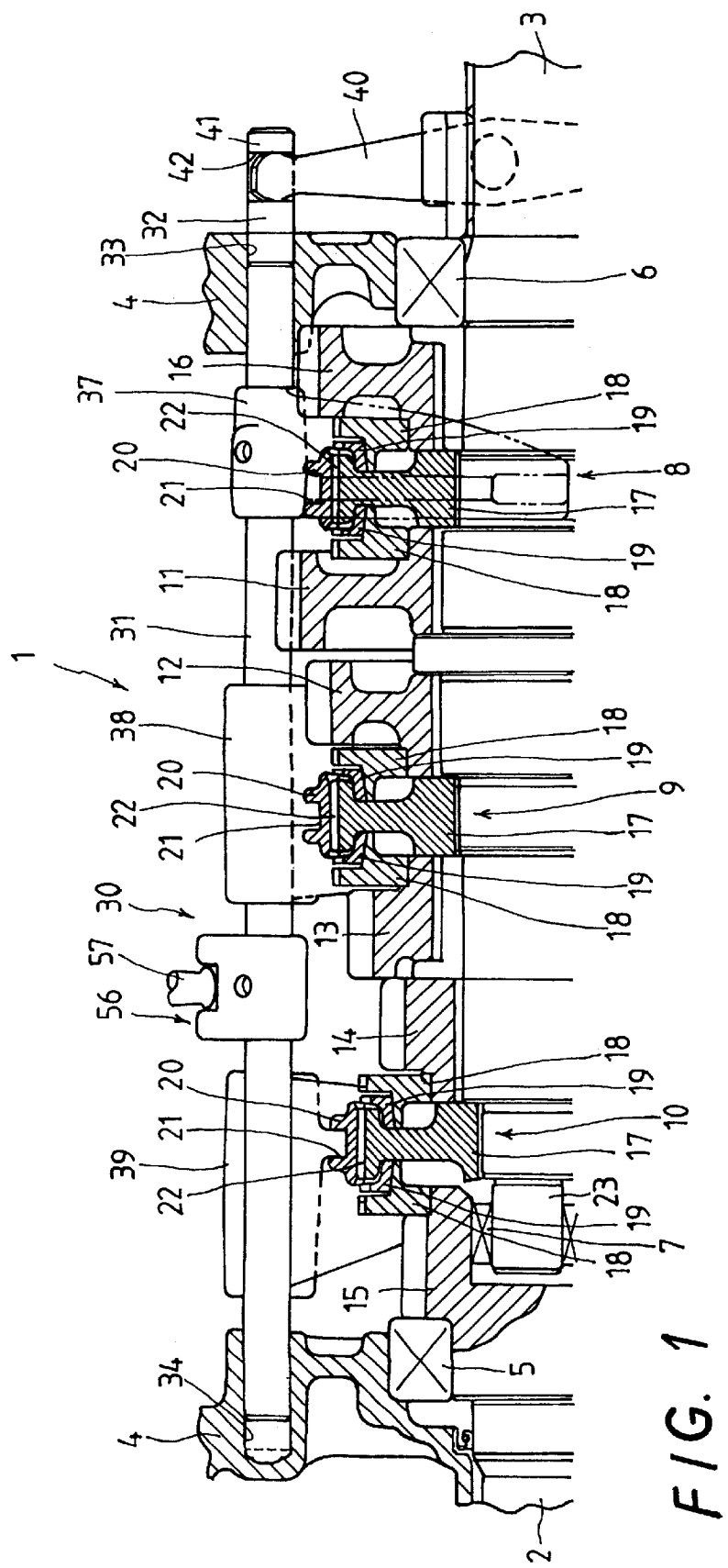
FIG. 1 is a fragmentary sectional view showing a preferred embodiment of a manual transmission according to the first invention in this application.

A preferred embodiment of a manual transmission according to the present invention will be hereinafter with reference to the accompanying drawings. The manual transmission in FIG. 1 is a synchromesh transmission for front-engine rear-drive cars, shown at its neutral position.

The synchromesh transmission 1, as apparent from the drawings, has an input shaft 2 and output shaft 3 that are each supported for rotation in a transmission case 4 of aluminum alloys through bearing means 5, 6. Mounted on the output shaft 3 through bearing means a train of synchromesh gearings of from a large gear 11 to a small gear 14 while a synchromesh gear 15 is arranged on the end of the input shaft 2. The output shaft 3 is accommodated for rotation at its shaft end 23 in the gear 15 through a bearing means 7. The large gear 11 is a 1st synchromesh gear. Likewise, the gears 12 to 15 are a 2nd to 5th synchronizing gears, respectively. These synchronizing gears 11 to 15 are in constant mesh with gears, not shown, fixed on a countershaft, not shown, which is arranged in parallel with the output shaft 3. A gear 16 is a reverse synchromesh gear that is in mesh with a reverse-idler gear, not shown, which is in constant mesh with a gear, not shown, fixed on the countershaft, not shown. As the countershaft rotates in constant mesh with the gear 15, all the gears 11 to 16 on the output shaft 3 are allowed to turn freely at the center position, or neutral. Motion transmitting means 8 to 10 are each arranged between any confronting paired gears of the gears 11 and 16, the gears 12 and 13, and the gears 14 and 15. Any one of the power transmitting means 8 to 10 is selectively operated by manipulating a gearshift lever, not shown, so as to shift any one of the selected paired gears towards the desired direction.

The power transmitting means 8 to 10 are identical in structure with each other except for the size of the associated gears. To that extent, the same or equivalent components have given the same reference characters, so that the detailed description will be taken in connection with only the power transmitting means 9. On the manual transmission illustrated, the power transmitting means 9 is disposed between the low-speed gear 12 and the high-speed gear 13, which are mounted on the output shaft 3 for free rotation, so as to synchronize the output shaft 3 with any one of the gears 12, 13. The power transmitting means 9 is comprised of a clutch hub 17 arranged to be splined to the output shaft 3 thereby turning the output shaft 3 in unison, dog teeth 18, 18 formed integrally on the gears 12, 13 so as to face to axially opposing sides of the clutch hub 17, blocking rings 19, 19 each disposed between the clutch hub 17 and each of the dog teeth 18, 18 to bring the clutch hub 17 into synchronization in rotation with the dog teeth 18, 18, and a sleeve 20 arranged for axially sliding movement and provided on its inner periphery with internal splines 22, which are to be engaged with external splines on the outer periphery of the clutch hub 17. The sleeve 20 has on its outer periphery an annular groove 21, which is engaged with a shift arm that will be described in detail hereinafter. In the center position or neutral shown in FIG. 1, the internal splines 22 of the sleeve 20 are in engagement with the corresponding external splines on the clutch hub 17, nevertheless the internal splines are out of engagement with the teeth of the blocking rings 19, 19 as well as the dog teeth 18, 18. The blocking rings 19, 19 are movable axially along the output shaft 3. The dog teeth 18, blocking ring 19 and sleeve 20, in combination, constitute a spline clutch of the synchronizer.

The actions of the transmission constructed as described just above are described below. When the sleeve 20 is moved toward any one direction of the axial opposing directions by manipulating the gearshift lever, the internal splines 22 of the sleeve 20 are brought into engagement with the blocking ring 19 while urge the blocking ring 19 against a cone surface of the dog teeth 18. This brings the blocking ring 19 into frictional engagement with the dog teeth 18 whereby the synchronizer action takes place between the blocking ring 19 and the dog teeth 18. Further sliding movement of the sleeve 20 causes its splines 22 to engage completely with the teeth of the blocking ring 19. The synchronous rotation of the sleeve 20 with the blocking ring 19 helps ensure the smooth engagement of the splines 22 with the dog teeth 18 when the sleeve 20 is further moved over the dog teeth 18. Upon completion of the shift, the power transmission path is achieved wherein power flows from the gear 12 or 13, through the dog teeth 18, sleeve 20 and clutch hub 17, to the output shaft 3.

A gearshift mechanism adapted to the synchromesh transmission 1 as described above will be explained with reference to FIG. 1 and FIG. 2, which is a sectional view of a preferred embodiment of the manual transmission according to the present invention. A gearshift mechanism 30 has a pair of selector rods 31, 32 that are arranged in parallel with the output shaft 3 and fitted for axially sliding movement in matching holes 33 to 36 formed in the transmission case 4. A 1st-reverse shift arm 37 is fixed on the one selector rod 32 against sliding movement, whereas a 2nd-3rd shift arm 38 are arranged unobstructively to each other on their shift operation. The other selector rod 32 is engaged with a 4th–5th shift arm 39. In addition, a shift lever 40 for a 6th shift arm is fitted in a groove 42 that is formed at the end 41 of the selector rod 32 extending out of the transmission case 4. The 4th–5th shift arm 39 is also arranged so as to make no interference with the other shift arms 37, 38.

The shift arms 37 to 39 and shift lever 40 are composed of arm bodies connected or movably coupled to the selector rods 31, 32, forks extending from the arm bodies so as to engage at their distal ends with the annular grooves 21 formed around the peripheries of the sleeves 20, and shift blocks, described hereinafter, extending from the arm bodies.

The 1st-reverse shift arm 37 is fixed on the selector rod 31 by a suitable fixture means such as a bolt 43. Moreover a shift block 44 formed with a groove 45 is mounted on the selector rod 31 by a suitable fixture means such as a bolt 46.

The 2nd–3rd shift arm 38 is fitted for sliding movement through a bore 47 on the selector rod 31. The 2nd–3rd shift arm 38 is integrally provided with a shift block 48 that extends towards the shift block 44 and is formed with a groove 49.

The 4th–5th shift arm 39 is engaged for sliding movement with the other selector rod 32, the end 41 of which extends out of the transmission case 4 into an extension housing and has the groove 42 in which is fitted the shift lever 40 for the 6th shift arm. The 4th–5th shift arm 39 is identical in structure with the 2nd–3rd shift arm 38 and the shift arms 38, 39 are arranged in symmetry with each other. That is to say, the 4th–5th shift arm 39 has the arm body formed therein with a bore 50 to receive therethrough the selector rod 32 for sliding movement, and the fork extending from the arm body to make engagement with the annular groove 21 around the outer periphery of the sleeve 20. The 4th–5th shift arm 39 also has a shift block 51 that extends from the arm body and is formed therein a groove 52. The shift block 51 is also identical in structure with the shift block 48 and the blocks 48, 51 are arranged in symmetry with each other. The shift lever 40 for the 6th shift arm is supported for pivotal movement to the transmission case 4. A shift block 53 to move the shift lever 40 is mounted to the selector rod 32 by a suitable fixture means such as bolt 54. The shift block 53 is formed with a groove 55. The shift block 53 is identical in structure with the shift block 44 and arranged in symmetry with the shift block 44.

The shift blocks 44, 48, 51 and 53 constitute in combination a shift block mechanism 56. On the neutral of the shift block mechanism 56, the grooves 45, 49, 52 and 53 formed on the shift blocks 44, 48, 51 and 53, respectively, are in alignment with each other with respect to the selecting direction, that is, along the direction normal to the axes of the selector rods 31, 32, as well as in symmetry relationship with each other about an axis that passes through a center C in perpendicular to a plane of paper.

Figure 2:
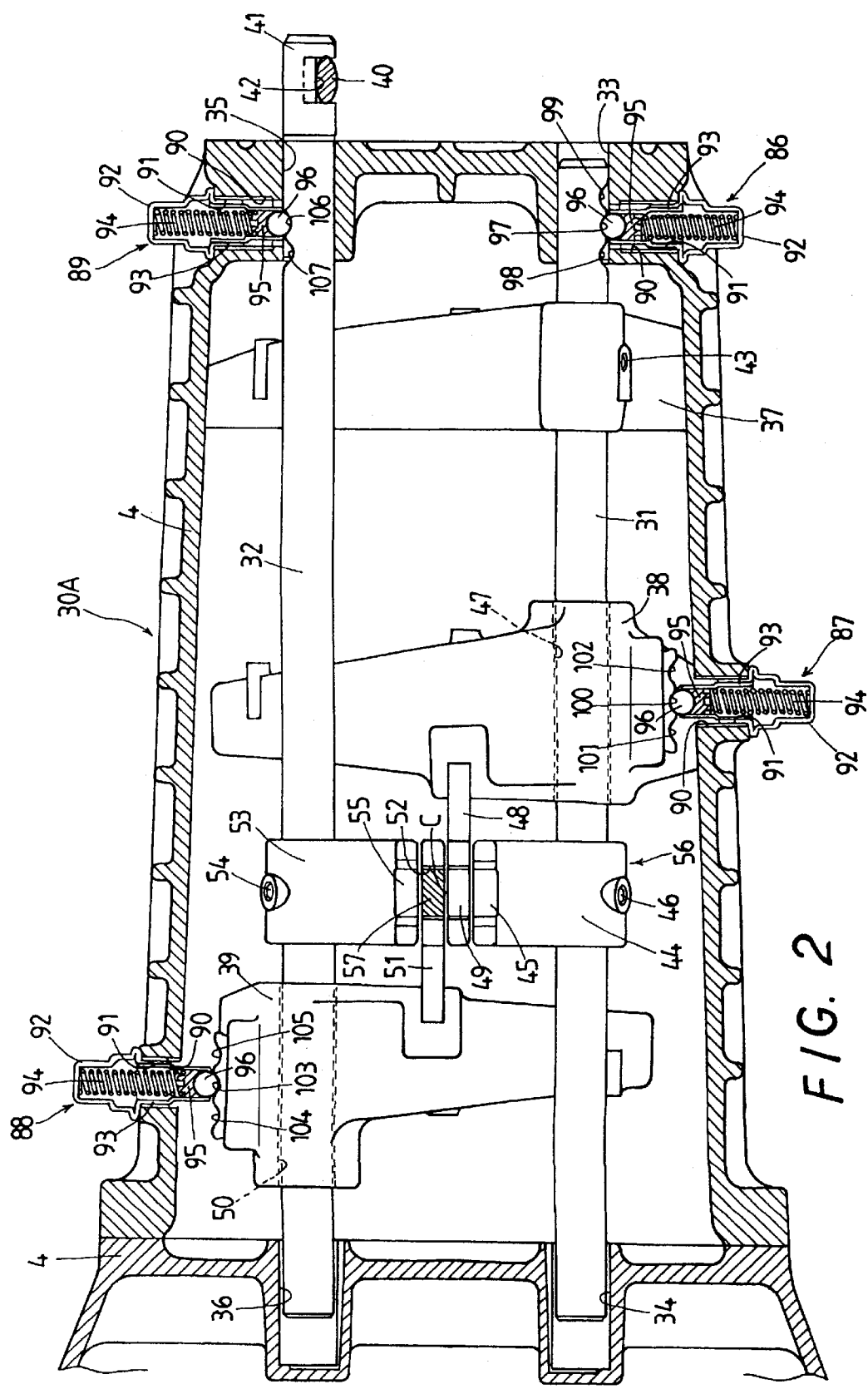
FIG. 2 is a schematic sectional view of the manual transmission shown in FIG. 1.
Figure 3:
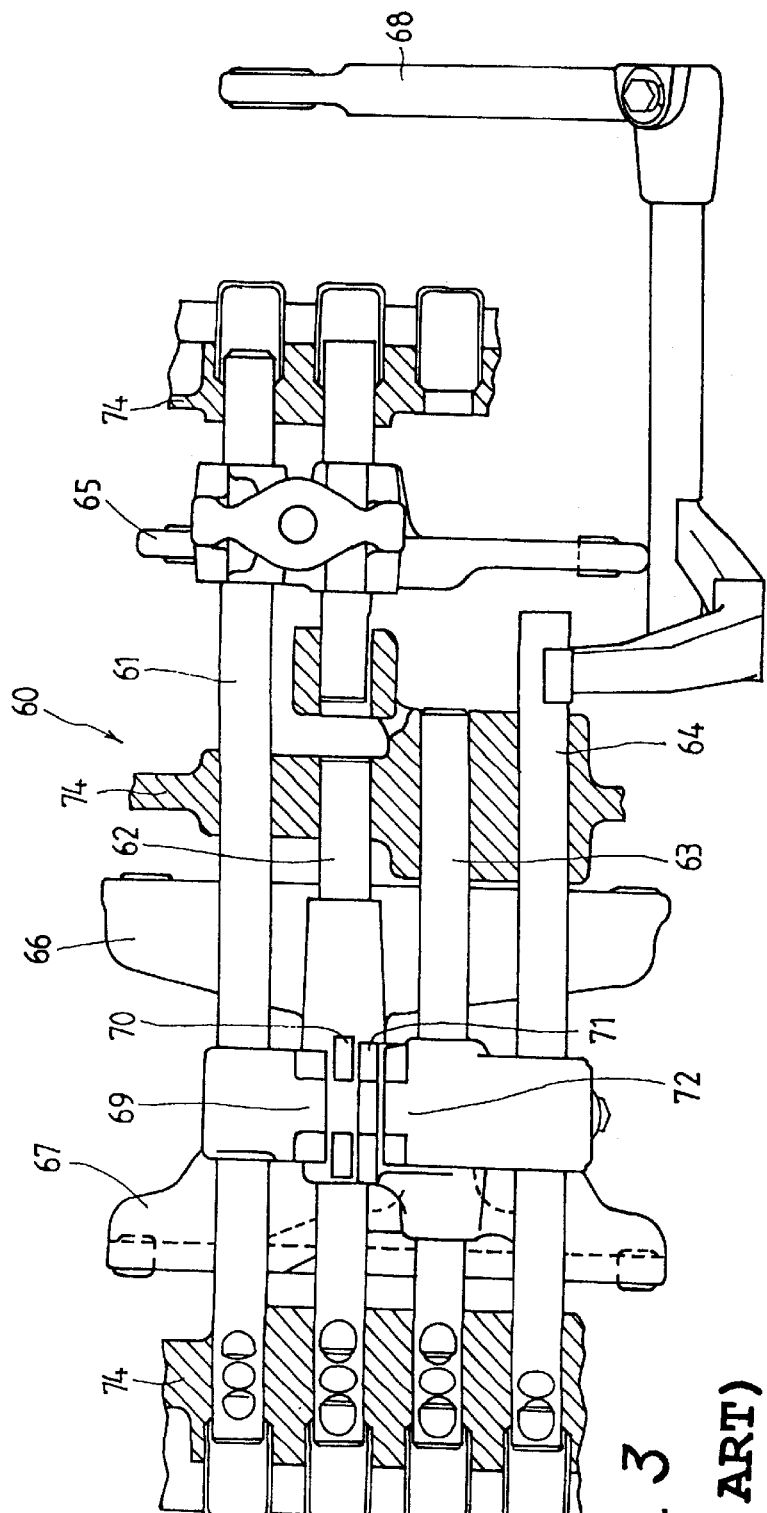
FIG. 3 is a fragmentary top plan view, partially in section, a prior gearshift mechanism of multi-rod gear selector type.

An engaging means 57 provided in association with the gearshift lever, not shown, may be brought into selective engagement with any one of the grooves 45, 48, 52 and 55, formed on the shift blocks 44, 48, 51 and 53, respectively, in accordance with the manual selection of the gearshift lever. In FIG. 2, there is shown the engaging means 57 under engagement with the groove 52 as will be explained later. In such event that the engaging means 57 is shifted along the alignment direction of the grooves 45, 49, 52 and 55, the manual selection of the gearshift lever makes the engaging means 57 into the selective engagement with any one of the grooves 45, 49, 52 and 55, which are formed on the shift blocks 44, 48, 51 and 53.

When manipulating the gearshift lever, which has been engaged selectively with any one of the grooves 45, 49, 52 and 55, along the axial direction of the selector rods 31, 32, that is, on the manual shift towards the shift direction, the manual shift power along the shift direction may be transmitted, through any selected one of the shift arms 37, 38, 39 and shift lever 40, to the associated sleeve 20 of each of power transmitting mechanisms 8 to 10, resulting in making the sleeve 20 move towards the shift direction.

For example, the first movement of the gearshift lever, or the manual selection, makes the engaging means 57 fit in the groove 45. The second movement of the gearshift lever, or the manual shift, applies the shift power through the combination of the engaging means 57 with the groove 45 to the shift block 44 that in turn moves the shift arm 37 along the axial direction of the selector rod 31. That is, when the shift is made towards the right of FIG. 2, the reverse is selected. In contrast, on shifting towards the left, the first-forward speed is selected.

According to the manual transmission of the present invention, as apparent from the above, a pair of the selector rods 31, 32 is disposed in parallel with the output shaft 3. The selector rod 31 has mounted thereon the shift arm 38 for sliding movement while the other selector rod 32 has mounted thereon the shift arm 39 for sliding movement. The shift arms 38, 39 are integrally formed with the shift blocks 48, 51, respectively. Moreover, the shift arm 37 is fixed to the selector rod 31 and the shift lever 40 is fitted in the selector rod 32. Secured respectively on the selector rods 31, 32 are the shift blocks 44, 53 corresponding to the shift arm 37 and the shift lever 40. None of the shift blocks 44, 48, 51 and 53 extends beyond the selector rods 31, 32 to be concentrated and consequent less space for the gearshift mechanism 30 of the manual transmission may be sufficient. The symmetric arrangements of the shift arms 38, 39 and shift blocks 44, 48, 51 and 53 have the advantage of universality of components and parts. In addition, materials such as aluminum alloys less in stiffness are permitted to use for the shift arms 37 to 39.

On the manual transmission of the present invention, moreover, detent mechanisms 86 to 89 are provided for locking the selector rods 31, 32 and shift arms 38, 39 against the transmission case 4 in order to prevent the accidental improper upshift or downshift. The detent mechanisms 86 to 89 are identical in structure with each other except for the size of the associated gears, so that the detailed description will be taken in connection with only the detent mechanism 86. The transmission case 4 is formed with an opening 90 for accommodating therein the detent mechanism to be associated with the selector rod 31. The opening 90 is partly formed with a female thread 91, which mates with a male thread 93 around the partial periphery of a casing 92 when attaching the detent mechanism 86 to the transmission case 4.

Contained in the detent casing 92 is a coiled detent spring 94, which is under compression to thereby urge a detent ball 96, disposed at the open end of the detent casing 92, through a ball retainer 95 against the selector rod 31. When the selector rod 31 is at the neutral position, the detent ball 96 in the detent mechanism 86 is forced by the elastic action of the coiled detent spring 94 into a neutral notch 97 in the selector rod 31 to thereby prevent the selector rod 31 from moving.

The selector rod 31 is further provided other gear position notches 98, 99 at the axially opposite sides thereof with respect to the neutral notch 97. Each of the gear position notches 98, 99 is spaced apart from the neutral notch 97 by a distance that corresponds to an axial moving amount of the selector rod 31 from its neutral position owing to the manual shift of the gearshift lever, which is in engagement with the groove 45 of the shift block 44. When manipulating the gearshift lever under such event that the engaging means 57 is brought into engagement with the groove 45 on the shift block 44 so as to select, for example, the reverse, the detent ball 96 is forced back out of the neutral notch 97 against the coiled detent spring 94 during a first portion of the shift of the selector rod 31. The detent ball 96 is then fitted into the gear position notch 98 of the selector rod 31 at the completion of the manual shift thereby locking the selector rod 31 to its position selected. In contrast, when shifting the gearshift lever to the 1st-speed forward position, the detent ball 96 is locked into another gear position notch 99. As a result, the detent mechanism may surely prevent the selector rod 31 from the accidental movement on either of the neutral and gear positions when the shifts of the shift block 44 are made from one speed to another, thereby help ensure the reliable manipulation of the gearshift lever as well as render the drivers better shift quality.

On selection of the 2rd-speed or 3th-speed, the gearshift lever is manipulated with the engaging means 57 being kept in engagement with the groove 49 on the shift block 48. In a detent mechanism 87 at the neutral position, the detent ball 96 is fitted into a neutral notch 100, which is formed on the shift arm 38. When making the shift from the neutral to the 2nd-speed forward, the detent ball 96 is fitted into a 2nd-speed notch 101 on the shift arm 38. On the contrary, the shift to the 3rd-speed causes the detent ball 96 to fit into a 3rd-speed notch 102 on the shift arm 38. It will be thus understood that the detent mechanism may surely prevent the selector rod 31 from the accidental movement on either of the neutral, 2nd-speed and 3rd-speed positions when the shifts of the shift block 48 are made from one speed to another.

Likewise the manual shift as described just above, the selection of the 4th-speed or 5th-speed results in forcing the detent ball 96 in a detent mechanism 88 to fit into any one of neutral, 4th-speed and 5th-speed notches 103, 104, 105 thereby preventing the selector rod 32 from moving. On the other hand, the selection of the 6th-speed causes the detent ball 96 in a detent mechanism 89 to fit into any one of neutral and 6th-speed notches 106, 107 so that the selector rod 32 is locked against moving.

Unlike the six-forward, one reverse transmission shown in FIGS. 1 and 2, another transmission with no need of the shift lever 40 for the 6th-speed shift lever allows to use the selector rods 31, 32 that are made of the components identical in length, thereby contributing to promote the universal use of the parts and components.

Industrial Applicability

The manual transmission according to the present invention constructed as described above makes it possible to reduce the number of the selector rods and their associated components and parts with no adverse influence on the speed-changing manipulation, lighten the weight of the shift mechanism in the transmission, and lower the production costs. The shift mechanism may be designed less in height with no obstructive relationship among the gears and selector rods assembled for the manual transmission, thereby resulting in making the transmission compact in dimension. Moreover, only the two selector rods are used and the shift blocks may be concentrated by making use of the space between a pair of the selector rods, so that the shift mechanism is made less in height, thereby resulting in making the transmission compact in dimension.

In addition, the manual transmission of the present invention provides the shift mechanism that is better in space saving with no use of the material greater in stiffness for the shift arms. The shift blocks are arranged evenly over the two selector rods and, therefore, the manual transmission of this invention may deal with the increased number of forward speeds with ensuring the desired stiffness of the shift arms. High flexibility of the layout and design of the shift arms allows using any material such as aluminum, which is light in weight and relatively less in mechanical strength. Furthermore, the shift blocks constituting in combination the shift block mechanism are arranged in symmetry relationship about the axis along the center of the shift blocks that are in alignment with each other on the neutral of the transmission. This design has the advantage of universality of components and parts such as the shift arms and shift blocks, resulting in diminishing the desired number of the parts for the shift mechanism and consequent saving the production costs.

What is claimed is:

1. A manual transmission comprising power transmitting mechanisms provided with gear pairs that are different in transmission ratio from each other and accommodated in a transmission case, an input shaft for applying a torque to the power transmitting mechanisms, an output shaft applied with a converted torque transmitted through the power transmitting mechanisms in which a rotation of the input shaft is changed in rotational speed by one gear pair selected depending on a selection and shift manipulation of a gearshift lever, a pair of selector rods arranged in parallel with the output shaft, shift blocks mounted on the selector rods so as to be selected in accordance with the selection manipulation of the gearshift lever and then moved along the selector rods to any shift direction in response to the shift manipulation of the gearshift lever, and shift arms arranged correspondingly to the shift blocks and movable towards the shift direction through the selected shift block, depending on the shift manipulation of the gearshift lever, thereby to select the gear transmitting the rotation in the input shaft to the output shaft, wherein the selector rods are each provided thereon with any one of the shift arms and its associated shift block, which are mounted on the selector rod against axial movement, and also provided with another shift arm having the associated shift block, which is mounted on the selector rod for sliding movement.

2. A manual transmission constructed as defined in claim 1, wherein the shift blocks are each provided with an engaging portion to be brought into engagement with an engaging means that is moved depending on the select manipulation of the gearshift lever, and the engaging portions on the shift blocks are arranged in concentrated relation with each other in a space between the paired selector rods.

3. A manual transmission constructed as defined in claim 2, wherein the engaging portions on the shift blocks are in alignment with each other along the select direction on a neutral phase of the transmission, so that the engaging portions are allowed to move in the select direction normal to the selector rods, depending on the select manipulation of the gearshift lever.

4. A manual transmission constructed as defined in claim 3, wherein the shift blocks fixed on the selector rods against sliding movement are identical in structure with each other while the shift blocks for the shift arms mounted on the selector rods for sliding movement are also identical in structure with each other, and all the shift blocks are arranged so as to be concentrated with each other on the neutral phase of the transmission in symmetric relation with respect to a central point of the concentrated shift blocks.

5. A manual transmission constructed as defined in claim 1, wherein the selector rods and the shift arms mounted on the selector rods for sliding movement are each locked against moving at any one of its neutral position and shift positions, which are spaced apart from the neutral position, by means of each detent mechanism that is provided to the transmission case.

6. A manual transmission constructed as defined in claim 5, wherein the selector rods as well as the shift arms mounted on the selector rods for sliding movement are each provided thereon with notches that are arranged in coincidence with the neutral and shift positions selected by manipulating the gearshift lever, and further the detent mechanisms are each comprised of a detent ball to be fitted into any one of the notches, a means for urging the ball towards its associated notch, and a detent casing accommodating therein the ball and urging means.

7. A manual transmission constructed as defined in claim 6, wherein the detent mechanisms are each attached to the transmission case by fitting the detent casing into a bore formed in the transmission case.

8. A manual transmission constructed as defined in claim 1, wherein the power transmitting mechanisms are each comprised of a clutch hub connected to the output shaft, a pair of confronting synchronizing gears mounted on the output shaft for rotation, facing to axially opposing sides of the clutch hub so as to transmit the rotation from the input shaft with any preselected transmission ratio, a sleeve splined to the clutch hub for axially sliding movement along the output shaft by moving the shift arms in the shift direction, and blocking rings each provided between the clutch hub and any one of the paired synchronizing gears to make clutch-engagement with both the sleeve and the associated synchronizing gear, depending on the shift of the sleeve, thereby synchronizing in rotation the clutch hub with the associated synchronizing gear.

* * * * *